(No Model.)

J. S. & G. H. HILLYER.
AUTOMATIC SAMPLER FOR FLOUR AND OTHER SUBSTANCES.

No. 247,644. Patented Sept. 27, 1881.

WITNESSES:
Chas. Nida
C. Sedgwick

INVENTOR:
J. S. Hillyer
G. H. Hillyer
BY
Munn & Co.
ATTORNEYS.

UNITED STATES PATENT OFFICE.

JAMES S. HILLYER AND GEORGE H. HILLYER, OF FARIBAULT, MINNESOTA.

AUTOMATIC SAMPLER FOR FLOUR AND OTHER SUBSTANCES.

SPECIFICATION forming part of Letters Patent No. 247,644, dated September 27, 1881.

Application filed May 13, 1881. (No model.)

*To all whom it may concern:*

Be it known that we, JAMES S. HILLYER and GEORGE H. HILLYER, of Faribault, in the county of Rice and State of Minnesota, have invented a new and useful Improvement in Automatic Samplers for Flour and other Substances, of which the following is a specification.

Figure 1:
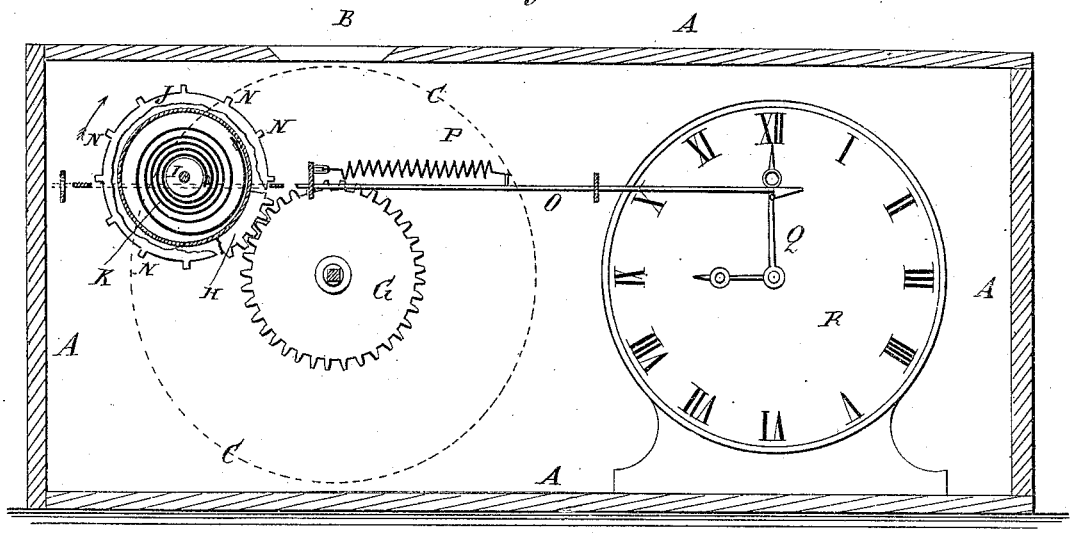
Figure 2:
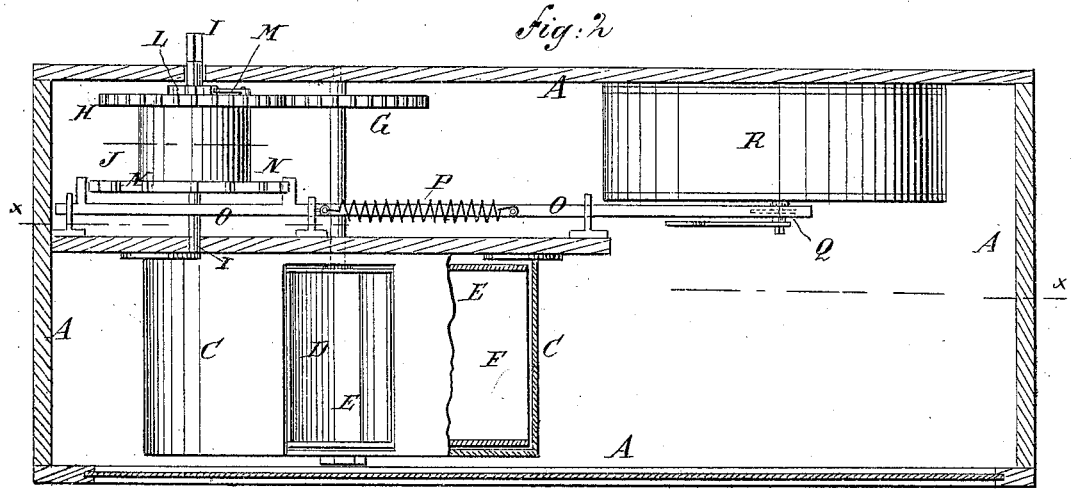
Figure 3:
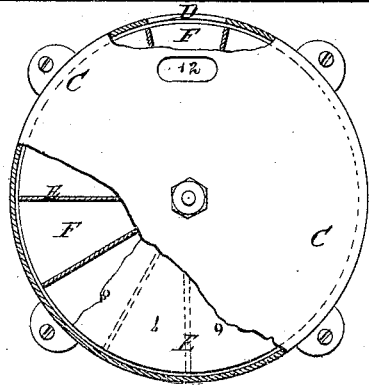

Figure 1 is a sectional side elevation of our improvement, taken through the line *x x*, Fig. 2. Fig. 2 is a plan view of the same, partly in section. Fig. 3 is an end view of the cylinders, parts being broken away.

Similar letters of reference indicate corresponding parts.

The object of this invention is to facilitate the taking of samples of flour and other substances at regular intervals of time.

The invention consists in constructing automatic samplers for flour and other substances with a stationary exterior cylinder having an aperture to admit the samples, a rotating interior cylinder having pockets to receive the samples, the spring for rotating the cylinder, the toothed or stop wheel for controlling the spring, the sliding stop-bar and its spring, and the hand of a clock-work for releasing the spring at fixed times, all constructed and operating as will be hereinafter fully described.

A represents the case of the sampler, which is designed to be connected with the spout, chute, or other conveyer through which the flour or other substances to be sampled passes.

In the top of the case A is formed an aperture, B, through which the substance to be sampled enters the sampler, and which can be closed with a slide when the sampler is removed, and when not required to be used. To the case A, beneath the aperture B, is secured a cylinder, C, which has an aperture, D, in its upper side corresponding in shape, size, and position with the aperture B. Within the cylinder C is fitted a revolving cylinder, E, in which are formed twelve (more or less) radial pockets, F, each corresponding in shape and size with the apertures B D. The journals of the cylinder E revolve in bearings in the case A, and to one of said journals is attached a gear-wheel, G, the teeth of which mesh into the teeth of the gear-wheel H, placed upon the shaft I. The shaft I revolves in bearings in the case A, and upon it is placed a wheel, J, which is rigidly connected with the gear-wheel H, and is connected with the said shaft I by a coiled spring, K, of sufficient power to revolve the cylinder E when the wheel J is released. The shaft I is connected with the gear-wheel H by a ratchet-wheel, L, and pawl M, so that it cannot be turned forward, but can be turned back by a key or other suitable means to coil the spring K. The wheel J is provided with teeth or stops N, with which engages a bar, O, to hold the said wheel from revolving. The bar O slides in guides or keepers attached to the case A or other suitable support, and is held forward by a spiral or other suitable spring, P, attached to it and to the case A, or other suitable support. The rear end of the stop-bar O has a shoulder formed upon it, with which engages the minute-hand Q of a clock-work, R. The clock-work R is attached to the case A, and is driven by a spring in the ordinary manner.

With this construction the minute-hand Q of the clock-work R at each revolution engages with the stop-bar O and draws it back, releasing the wheel J and allowing the spring K to revolve the cylinder E through the space of one pocket F. As the bar O is released from the minute-hand Q of the clock-work R the spring P draws it forward to engage with the next tooth N, and hold the sampler stationary until the minute-hand Q has made another revolution. With this construction the superintendent, after an absence, has samples of the work done during the said absence, and in case the mill should stop the empty pockets will show the fact, and will show him when and for about how long the stoppage continued, so that he can hold the proper party responsible.

Upon the head of the interior cylinder, E, opposite the pockets F, are placed numbers corresponding with the time when each pocket should receive its sample, which numbers can be seen through an aperture in the head of the exterior cylinder, C, as shown in Fig. 3.

Having thus fully described our invention, we claim as new and desire to secure by Letters Patent—

1. An automatic sampler for flour and other substances, constructed substantially as herein shown and described, consisting of the stationary exterior cylinder, C, having aperture D, the rotating cylinder E, having pockets F, the driving-spring K, the toothed wheel J, the sliding stop-bar O, the spring P, and the hand Q of a clock-work, R, as set forth.

2. In an automatic sampler for flour and other substances, the combination, with the case A, the exterior stationary cylinder, C, having aperture D, and the hand Q of a clock-work, of the rotating interior cylinder, E, having pockets F, the driving-spring K, the wheel J, having stop-teeth N, the sliding stop-bar O, and its spring P, substantially as herein shown and described, whereby samples will be taken at regular intervals, as set forth.

JAMES STEPHEN HILLYER.
GEORGE HENRY HILLYER.

Witnesses:
HENRY W. BINGHAM,
CHARLES L. LOWELL.